(12) United States Patent
Rodriguez, Jr.

(10) Patent No.: US 6,604,829 B2
(45) Date of Patent: Aug. 12, 2003

(54) COMPACT INTEGRATED FRONT PROJECTION SYSTEM

(75) Inventor: Ernesto M. Rodriguez, Jr., Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/325,584

(22) Filed: Dec. 19, 2002

(65) Prior Publication Data

US 2003/0123032 A1 Jul. 3, 2003

Related U.S. Application Data

(63) Continuation-in-part of application No. 09/841,021, filed on Apr. 24, 2001, now Pat. No. 6,530,664, which is a continuation of application No. 09/616,563, filed on Jul. 14, 2000, now Pat. No. 6,394,609, which is a continuation of application No. 09/261,715, filed on Mar. 3, 1999, now Pat. No. 6,179,426.

(51) Int. Cl.[7] .............................................. G03B 21/14
(52) U.S. Cl. ......................................... 353/79; 353/70
(58) Field of Search ............................... 353/69, 70, 79, 353/119, 122; 248/917, 918, 919, 920

(56) References Cited

U.S. PATENT DOCUMENTS

| | | | | |
|---|---|---|---|---|
| 5,349,400 A | * | 9/1994 | Kaplan et al. | ............... 353/119 |
| 5,624,173 A | * | 4/1997 | Davidson | .................... 353/119 |
| 6,179,426 B1 | | 1/2001 | Rodriguez, Jr. et al. | |
| 6,394,609 B1 | | 5/2002 | Rodriguez, Jr. et al. | |
| 6,530,664 B2 | * | 3/2003 | Vanderwerf et al. | ........... 353/74 |

* cited by examiner

Primary Examiner—William Dowling
(74) Attorney, Agent, or Firm—Yen Tong Florczak

(57) ABSTRACT

The present invention provides for a compact integrated front projection display system. The system comprises a frame having first and second portions and a foldable arm having first and second ends. The second end of the arm is connected to the first portion of the frame. The arm is moveable between a storage position and a projection position. The system also includes a retractable projection screen disposed on the second portion of the frame and a projection head mounted on the first end of the moveable arm.

8 Claims, 6 Drawing Sheets

COMPACT INTEGRATED FRONT PROJECTION SYSTEM

CROSS-REFERENCE TO RELATED APPLICATIONS

This application is a continuation-in-part of application Ser. No. 09/841,021, filed on Apr. 24, 2001 now U.S. Pat. No. 6,530,664 and entitled "Integrated Front Projection System With Enhanced Dry Erase Screen Configuration," which is a continuation of application Ser. No. 09/616,563, filed Jul. 14, 2000 issued as U.S. Pat. No. 6,394,609, which is a continuation of application Ser. No. 09/261,715, filed Mar. 3, 1999 issued as U.S. Pat. No. 6,179,426.

TECHNICAL FIELD

The present invention relates to a compact, lightweight integrated front projection display system. In particular, the present invention relates to a low-profile integrated front projection system that uses projection optics and a retractable screen optimized to work in conjunction with the optics to create the best viewing performance and produce the necessary keystone correction.

BACKGROUND

Video or electronic display systems are devices capable of presenting video or electronically generated images. Whether for use in home-entertainment, advertising, videoconferencing, computing, data-conferencing or group presentations, the demand exists for an appropriate video display device.

Image quality remains an important factor in choosing a display device. As the need increases for display devices offering a larger picture, factors such as cost, size, and weight become considerations. The size of the display system cabinet has been a factor, particularly for home or office use, where space for a large housing or cabinet may not be available. Weight of the display system is another factor, especially for portable or wall-mounted presentations.

Currently, the most common video display device is the typical CRT monitor, usually recognized as a television set. CRT devices are relatively inexpensive for applications requiring small to medium size images (image size traditionally is measured along the diagonal dimension of a rectangular screen). However, as image size increases, the increase in proportions and weight of large CRT monitors can become cumbersome and restrict their use and placement. Also, screen curvature issues appear as the CRT screen size increases. Finally, large CRT monitors consume a substantial amount of electrical power and produce electromagnetic radiation.

One alternative to conventional CRT monitors is rear projection television. Rear projection television generally comprises a projection mechanism or engine contained within a large housing for projection up on the rear of a screen. Back-projection screens are designed so that the projection mechanism and the viewer are on opposite sides of the screen. The screen has light transmitting properties to direct the transmitted image to the viewer.

By their very nature, rear projection systems require space behind the screen to accommodate the projection volume needed for expansion of the image beam. As background and ambient reflected light may degrade a rear projected image, a housing or cabinet generally encloses the projection volume. The housing may contain a mirror or mirrors to fold the optical path and reduce the housing depth. The need for "behind-the-screen" space precludes the placing of a rear projection display on the wall.

A newer category of video presentation systems includes the plasma displays.

Much attention has been given to the ability of plasma displays to provide a relatively thin cabinet (about 75–100 mm deep), which may be placed on a wall as a picture display in an integrated compact package. However, at the present time, plasma displays are costly and suffer from the disadvantages of low intensity (about 200–400 cd/m$^2$ range) and difficulty in making repairs. Plasma display panels are heavy (about 80–170 lb, about 36–77 kg), and walls on which they are placed may require structural strengthening.

A traditional type of video presentation device that has not received the same degree of attention for newer applications is front-projection systems. A front-projection system is one that has the projection mechanism and the viewer on the same side of the screen. Front projection systems present many different optical and arrangement challenges not present in rear projection systems, as the image is reflected back to the audience, rather than transmitted. An example of front projection systems is the use of portable front projectors and a front projection screen, for use in meeting room settings or in locations such as an airplane cabin.

One of the advantages of front projectors is the size of the projection engine. Electronic front projectors traditionally have been designed for the smallest possible "footprint", a term used to describe the area occupied on a table or bench, by the projector. Portable front projectors have been devised having a weight of about 10–20 lb (about 4.5–9 kg).

Nevertheless, front projection systems have traditionally not been considered attractive for newer interactive applications because of factors such as blocked image by the projector or the presenter, poor image brightness, image distortion, and setup difficulties.

Traditional electronic front projectors typically require a room that has the projection volume necessary for image expansion without any physical obstructions. Although images may be projected upon a large clear flat surface, such as a wall, better image quality is achieved by the use of a separate screen. FIGS. 1 and 2 illustrate a traditional front projection system. A projector 10 is placed on a table or other elevated surface to project an image upon a screen or projection surface 20. Those familiar with the use of electronic projectors will appreciate that tilting the projector below the normal axis of the screen produces an image with a shape distortion, known as a keystone effect. Most new electronic projectors offer a limited degree of keystone correction. As may be appreciated in FIG. 2, the placement of the projector may still interfere with the line of sight of the audience.

Of greater significance is the fact that to achieve a suitable image size, and also due to focus limitations, the projector 10 requires a certain "projection zone" in front of the screen 20. Table A lists the published specifications for some common electronic projectors currently in the market.

TABLE A

| Projector Type | Lens Focal Length | Imager Diagonal | Smallest Screen Diagonal | Shortest Throw Distance | Throw Ratio | Maximum Keystone Correction |
| --- | --- | --- | --- | --- | --- | --- |
| CTX Opto ExPro 580 | * | 163 mm Transmissive LCD | 1.0 m | 1.1 m | 1.1 | 20° offset/optical |
| InFocus LP425 | * | 18 mm Reflective DMD | 1.3 m | 1.5 m | 1.2 | 18° offset |
| Chisholm Dakota X800 | 43–58.5 mm | 23 mm Reflective LCD | 0.55 m | 1.2 m | 2.2 | 15° electronic |
| Epson Powerlite 7300 | 55–72 mm | 33.5 Transmissive LCD | 0.58 m | 1.1 m | 1.9 | * |
| Proxima Impression A2 | 45–59 mm | 23 mm Transmissive LCD | 0.5 m | 1.0 m | 2.0 | 12° offset |
| 3M MP8620 | 167 mm | 163 mm Transmissive LCD | 1.0 m | 1.2 m | 1.2 | 16° offset/optical |

*Not given in published specifications

Throw distance is defined as the distance from the projection lens to the projection screen. Throw ratio usually is defined as the ratio of throw distance to screen diagonal. The shortest throw distance available for the listed projectors is one meter. To achieve a larger image, between 40 to 60 inches (about 1 to 1.5 meters), most projectors must be positioned even farther away, at least 8 to 12 feet (about 2.5 to 3.7 meters) away from the wall or screen.

The existence of this "projection zone" in front of the screen prevents the viewer from interacting closely with the projected image. If the presenter, for example, wishes to approach the image, the presenter will likely block the projection and cast a shadow on the screen.

Traditional integrated projectors usually require optical adjustment, such as focusing every time the projector is repositioned, as well as mechanical adjustment, such as raising of front support feet. Electronic connections, such as those to a laptop computer, generally are made directly to the projector, thus necessitating that the projector be readily accessible to the presenter or that the presenter runs the necessary wiring in advance.

Another problem with front projectors is the interference by ambient light. In a traditional front projector, a significant portion of the projected light is scattered and not reflected back to the audience. The loss of the light results in diminished image brightness. Accordingly, a highly reflective screen is desirable. However, the more reflective the screen, the larger the possible degradation of the projected image by ambient light sources. The present solution, when viewing high quality projection systems, such as 35 mm photographic color slide presentation systems, is to attempt to extinguish ambient lights. In some very critical viewing situations, an attempt has been made even to control the re-reflection of light originating from the projector itself.

Some screen designers have attempted to address the ambient light problem with "mono-directional reflection" screens, that is, a projection screen that attempts to absorb light not originating from the projector, while maximizing the reflection of incident light is originating from the direction of the projector. Nevertheless, because portable projectors are used at various throw distances and projection angles, it has proven very difficult to optimize a screen for all possible projector positions and optical characteristics.

An alternative is to design a dedicated projection facility. Such a design necessitates a dedicated conference room, in which the projector and screen position, as well as the projector's optical characteristics, are rigorously controlled and calibrated. Structural elements may be used to suspend the selected projector from the ceiling. Once calibrated, such system would be permanently stationed. Such a facility may suffer from high costs and lack of portability.

Another issue that prevents optimal performance by front projectors is the keystone effect. If projectors are placed off-center from the screen, keystone distortion will occur. Keystone distortion is a particular image distortion where the projection of a rectangular or square image results in a screen image that resembles a keystone, that is, a quadrilateral having parallel upper and lower sides, but said sides being of different lengths.

Methods for the reducing of keystone distortion depend upon the position of the projector with respect to the screen. Keystone correction may be achieved by optical and by electronic methods. For large keystone correction in LCD imagers, optical methods are presently preferable, as electronic methods may suffer from pixelation distortion, as pixels become misaligned.

The need remains for a large screen video presentation system that offers efficient space utilization, lower weight and attractive pricing. Such a system should be compact and yield bright, high-quality images in room light conditions.

SUMMARY OF THE INVENTION

The present invention provides a compact, lightweight, integrated projection system. In one aspect, the present invention provides for an integrated front projection display. The display comprises a frame comprising a first portion and a second portion; a foldable arm comprising a first end and a second end, the second end of the arm connected to the first portion of the frame, wherein the arm is moveable between a storage position and a projection position; a retractable projection screen disposed on the second portion of the frame; a projection head mounted on the first end of the moveable arm such that the projection head does not substantially obstruct the view of the projection screen when the moveable arm is in the projection position; and a keystone correction mechanism for projecting a corrected image onto the projection screen.

BRIEF DESCRIPTION OF THE DRAWINGS

The present invention can be further described with reference to the following figures, wherein.

These figures are idealized, not drawn to scale, and are intended to be for illustrative purposes.

DETAILED DESCRIPTION OF THE INVENTION

An embodiment of the present invention comprises a front projection system that integrates an optical engine, having modular control and power supply electronics, and a dedicated retractable projection screen to provide a compact and light weight video display device.

Figure 1:
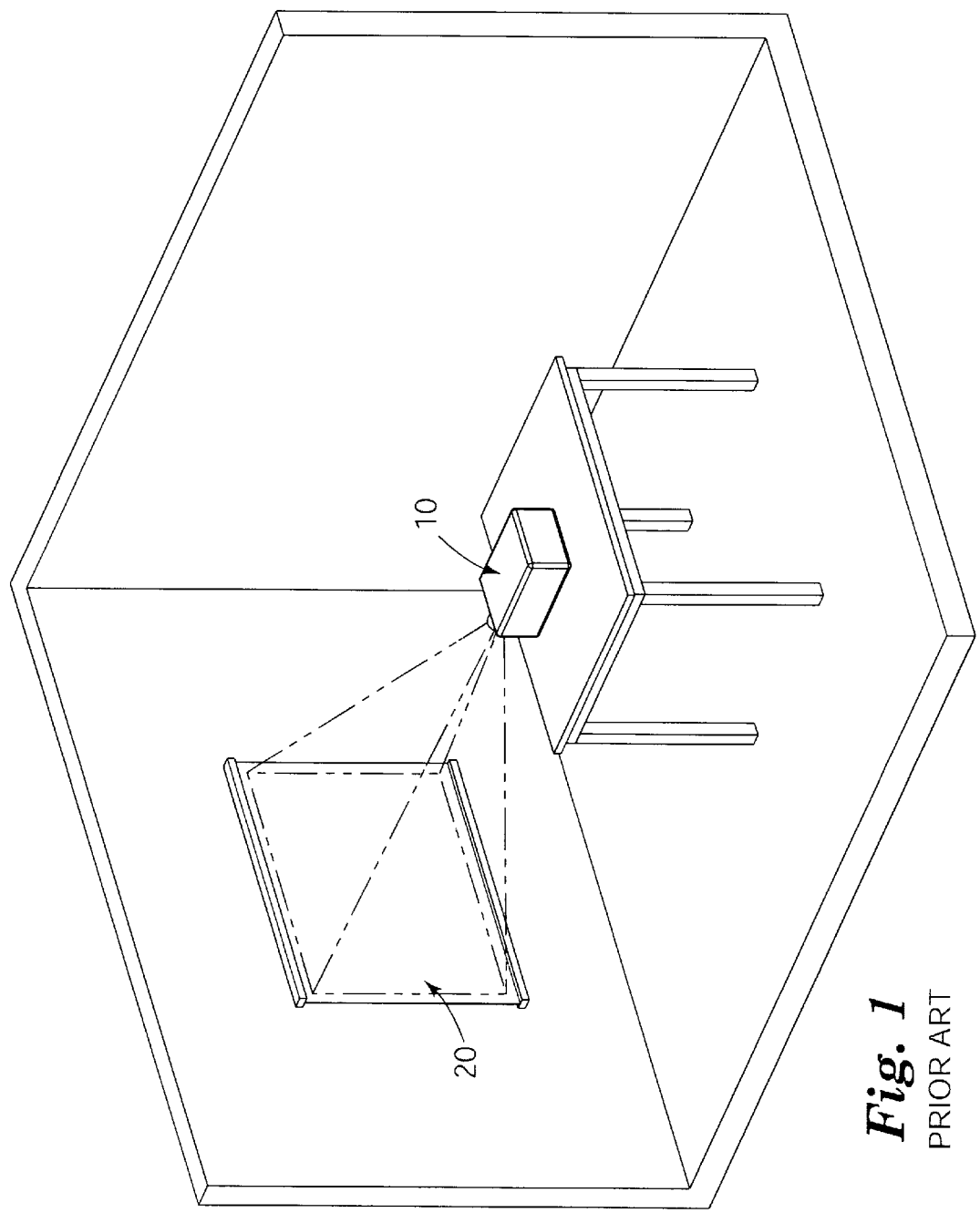
FIG. 1 is a perspective view of a traditional projection device and screen arrangement.
Figure 2:
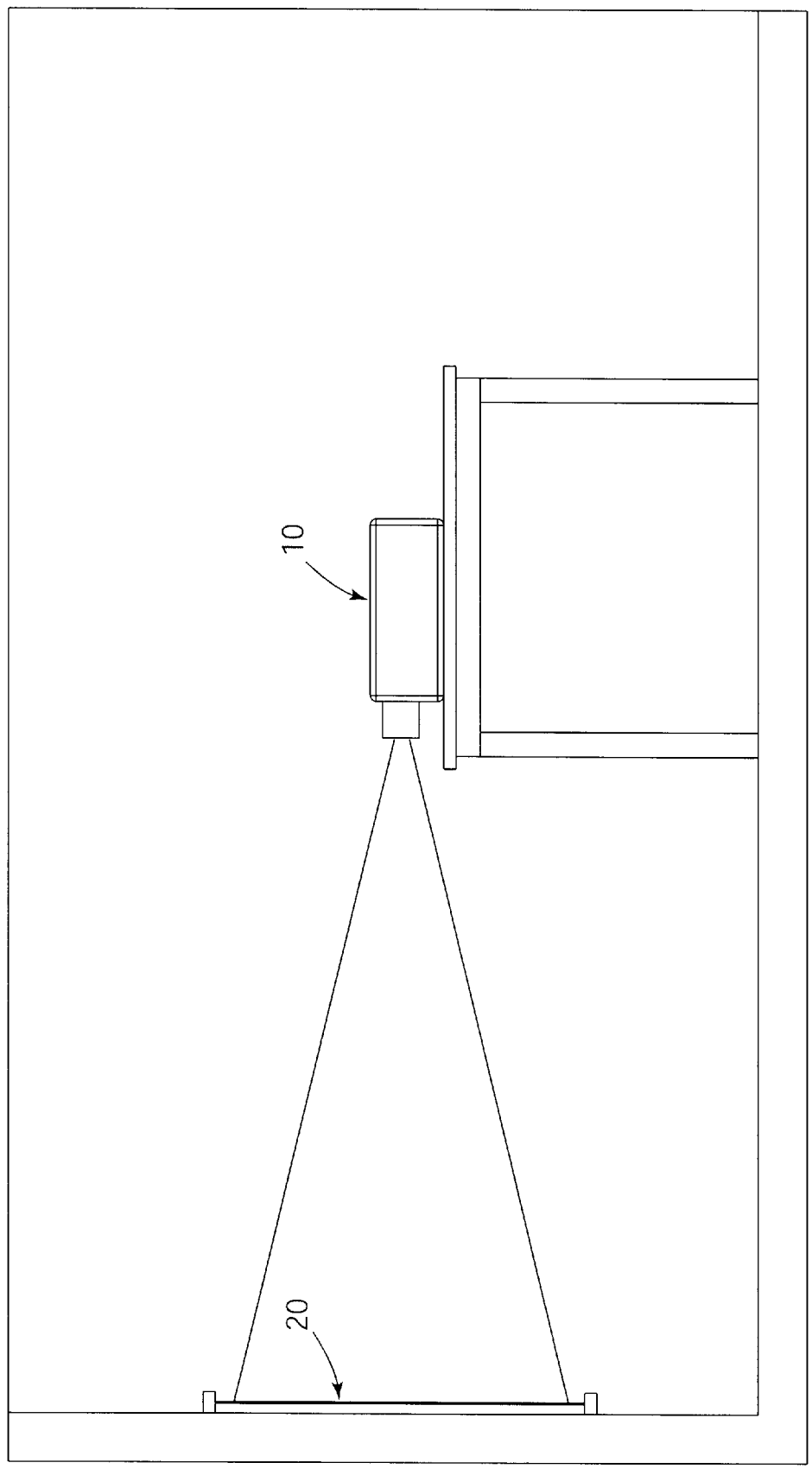
FIG. 2 is an elevation side view of the arrangement illustrated in FIG. 1.
Figure 3:
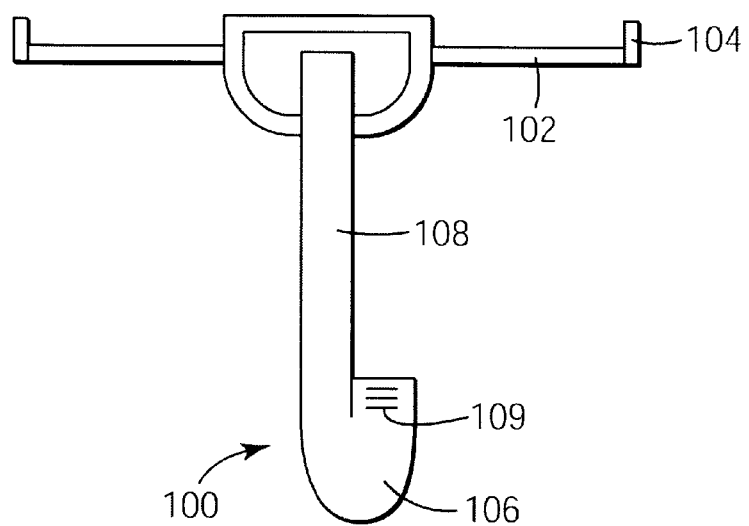
FIG. 3 is a top view of an exemplary integrated front projection system in accordance with the present invention in the open or projection position.
Figure 4:
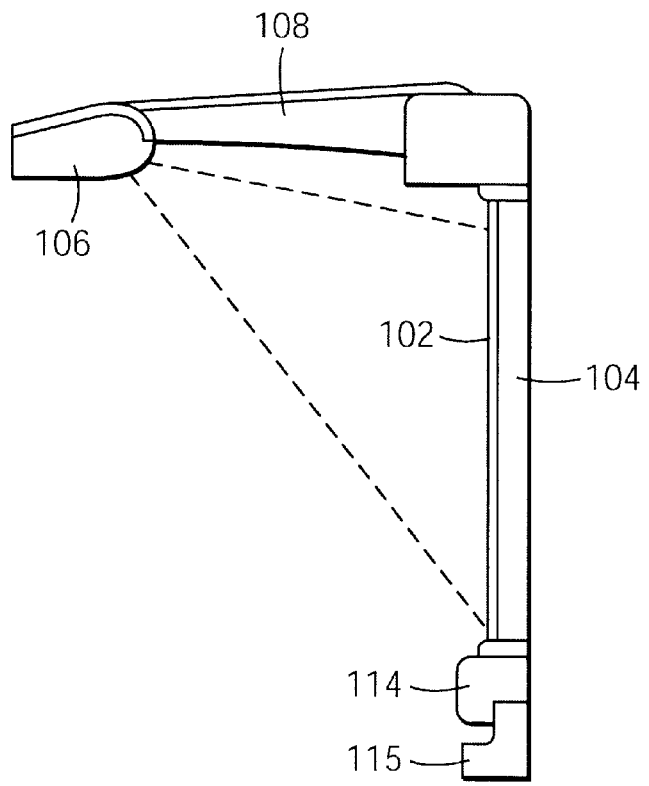
FIG. 4 is a side view of the integrated front projection system illustrated in FIG. 3.

Referring generally to FIGS. 3 and 4, retractable screen 102 is optically coupled to projection head 106. Screen 102 may be a flexible material extended over frame 104 or may be a rigid component. In an exemplary embodiment, both the screen and the frame are made of an integral sheet of material. Screen 102 may include multiple-layers or special coatings, such as to allow its use as an erasable whiteboard. An exemplary useful screen is discussed in U.S. patent application Ser. No. 09/841,021, assigned to the same assignee as this document, which application is hereby incorporated by reference in its entirety.

Frame 104 may contain and support other components of the system. For example, frame 104 may house additional components such as integrated speakers, input and output jacks, and a utility tray to hold accessories such as writing utensils, erasers, and the like. In the present exemplary embodiment, the mechanical infrastructure of projection system 100, arm 108 and frame 104, include lightweight materials such as aluminum, magnesium or plastic composites. The entire projection system, accordingly, is relatively light (35–45 pounds, 14–18 kilograms).

In one exemplary embodiment, an electrical motor can reside within second end 108b of the arm to control the arm movement. The motor may be AC, DC, manually driven by detentes, over-center-cam (spring loaded) or any other suitable type that provides reliable repeatable positioning. The motor can be a precision guided gear drive motor having two limit sensor switches to accurately position arm 108, and accordingly, projection head 106, in precise and repeatable closed and open positions.

The movement of arm 108 and the functions of projector system 100 may be controlled through control panel 114, a remote control (not shown), or other control mechanism. While arm 108 of projection system 100 is pivotally fixed at a single point, those skilled in the art will readily appreciate that a variety of different linkage and/or pivoting mechanisms may be used within the spirit of the present invention. In other exemplary embodiments, head 106 and arm 108 may include additional hinge or telescopic movement and the arm may be coupled to other portions of the frame or to a wall or post.

System 100 optimizes the coupling of the projection engine with precise positioning of head 106 in relation to screen 102 yield high contrast, brightest enhancement, image uniformity, optimal image position, and sharp focus. Because the optical parameters of the projection engine are known and selected for compatibility and the exact position of the projector head in the use position is known and predetermined, the exemplary screen may be designed and optimized to provide maximum illumination for the audience while reducing interference by ambient light.

In the projection mode, the projection system 100 generates a beam of light having a plurality of light rays. In relation to a coordinate system wherein the screen defines a z-plane, each light ray includes components along both the horizontal x-plane and the vertical y-plane. The angle of incidence of each light beam upon the screen depends on the optical characteristics of the projector, such as f-number, and the position of the projection head in relation to the screen.

FIG. 3 shows a top view of an exemplary embodiment of integrated front projection system 100, which includes frame 104, retractable screen 102, and foldable arm 108. In this particular embodiment, the screen and frame are an integral component of the system. Optionally, in the vicinity of projection head 106 are a plurality of openings, such as slots 109, to allow for air flow.

FIG. 4 shows another exemplary embodiment of integrated front projection system 100, where screen 102 is a separate component from frame 104. For illustrative purposes only, the dashed lines schematically represent the projection area on the screen. As one skilled in the art will recognize, the projected image will need correction if it is to appear as rectilinear image on the screen. The image can be corrected through the use of optics in the projection head alone or in combination with electronics, which is typically located in the frame. The projection system further includes control panel 114 and utility tray 115.

Figure 5B:
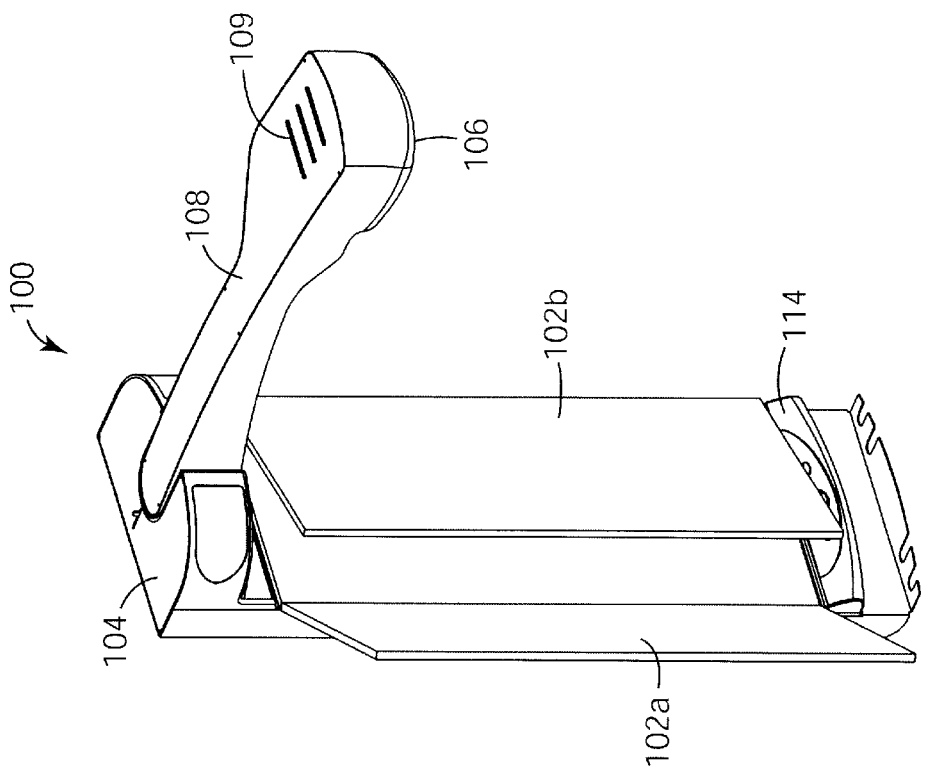
FIGS. 5a, 5b, and 5c are isometric views of an exemplary integrated front projection system illustrated a storage, setup, and projection positions respectively.
Figure 5A:
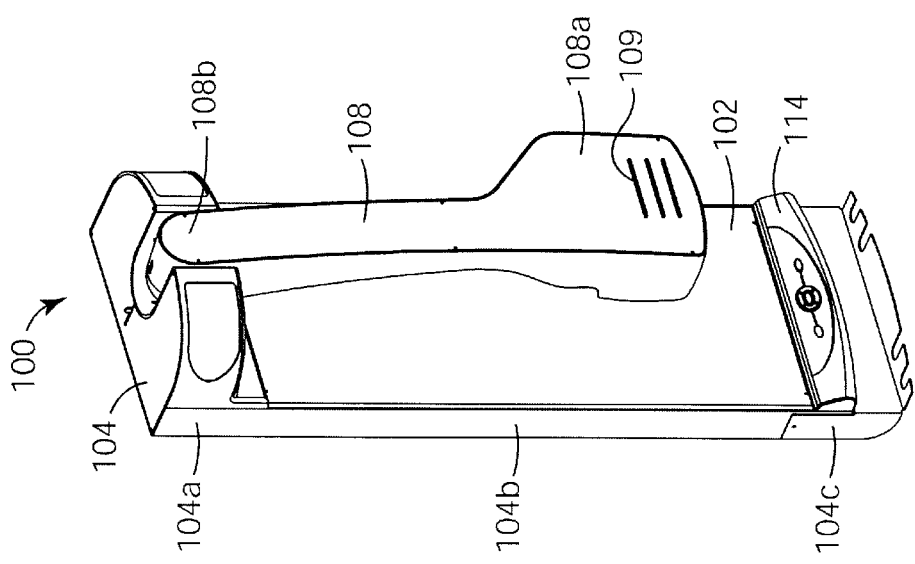

FIG. 5a shows yet another exemplary embodiment of integrated front projection system 100 in a closed or storage position. System 100 includes frame 104 having first, second, and third portions generally in the area designated as 104a, 104b, and 104c respectively. Foldable arm 108, having first and second ends 108a and 108b respectively, is attached to frame 104 such that second end 108b of the arm is disposed on first end 104a of the frame. At second end 108b of the arm is disposed a projection head (not shown). Optionally, slots 109 are disposed on the topside of second end 108b to allow for cooling of the projection head. Screen 102 is disposed generally in second portion 104b of the frame. In one exemplary embodiment, control panel 114 is disposed on third portion 104c of the frame. In the storage position, the arm lies on and parallel to the screen. FIG. 5b shows the embodiment illustrated in FIG. 5a in a partially closed (or partially open) position, where the integrated front projection system is not yet in the projection mode. In this partially open position, the arm has been raised such that it is perpendicular to the closed position shown in FIG. 3, i.e. perpendicular to and generally above the screen. The retractable screen has been partially opened as panels 102a and 102b are being unfolded. As used herein, the term "retractable" means that the screen is able to be drawn or pull back from its open, display mode to a closed, storage mode. Although FIG. 5b shows the retractable screen as three panels, two of which can be folded or retracted onto the frame 104, one skilled in the art will appreciate that other retractable designs can be used. For example, in another exemplary embodiment, the retractable screen is scrollable. In this partial open position, projection head 106 lies in an exact optical registration with screen 102. The advantage with this design is that the user will not have to reposition or refocus the projection head when it changes from the storage to the projection modes. And, FIG. 5c shows integrated front projection system 100 in a fully open or projection position where projection head 106 is in exact optical registration with screen 102.

Figure 5C:
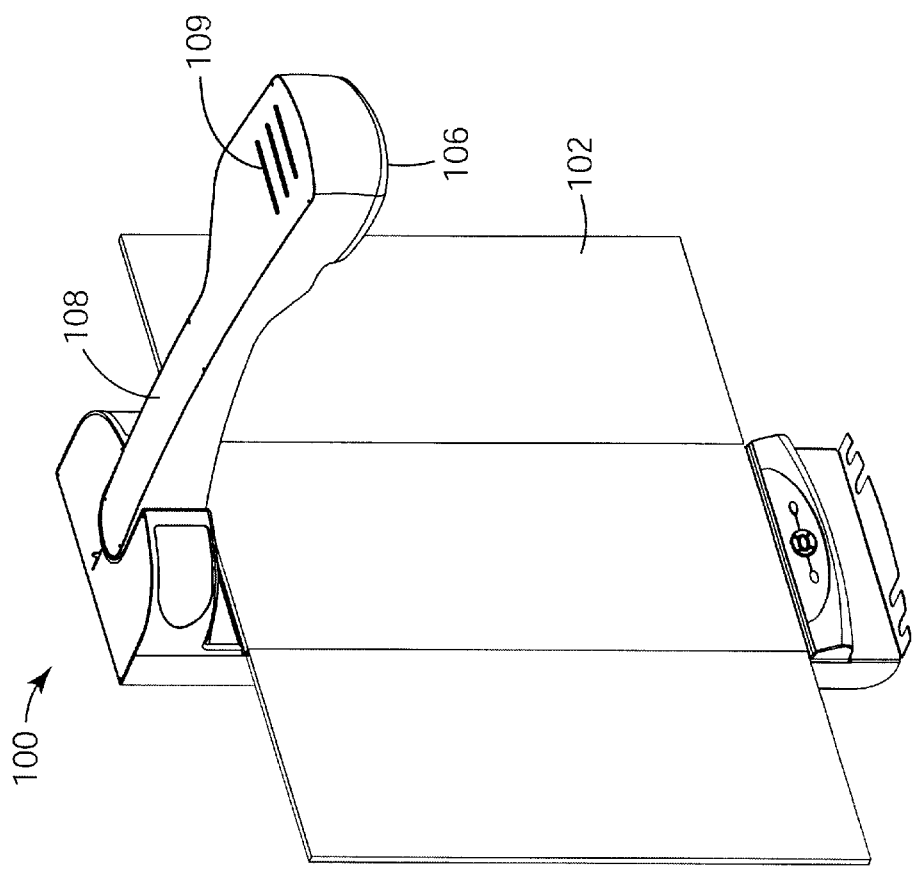

As may be appreciated in FIGS. 3, 4 and 5c, projection system 100 places projection head 106 at an extreme angle and close distance to screen 102, thus minimizing the possibility of the presenter's interference. Placing projection head 106 at the end of projection arm 108 presents unique mechanical and optical challenges. Even the lightest and most compact conventional portable projectors, at about 7 lb (3.2 kg), may have leveraged unbalanced strain upon the structure components. Optically, the throw distance necessary to focus the image would have necessitated a long arm, further creating lever amplified stresses on the structure. Even if structurally sound, the system would have projected a severely keystone distorted and relatively small image.

Figure 6:
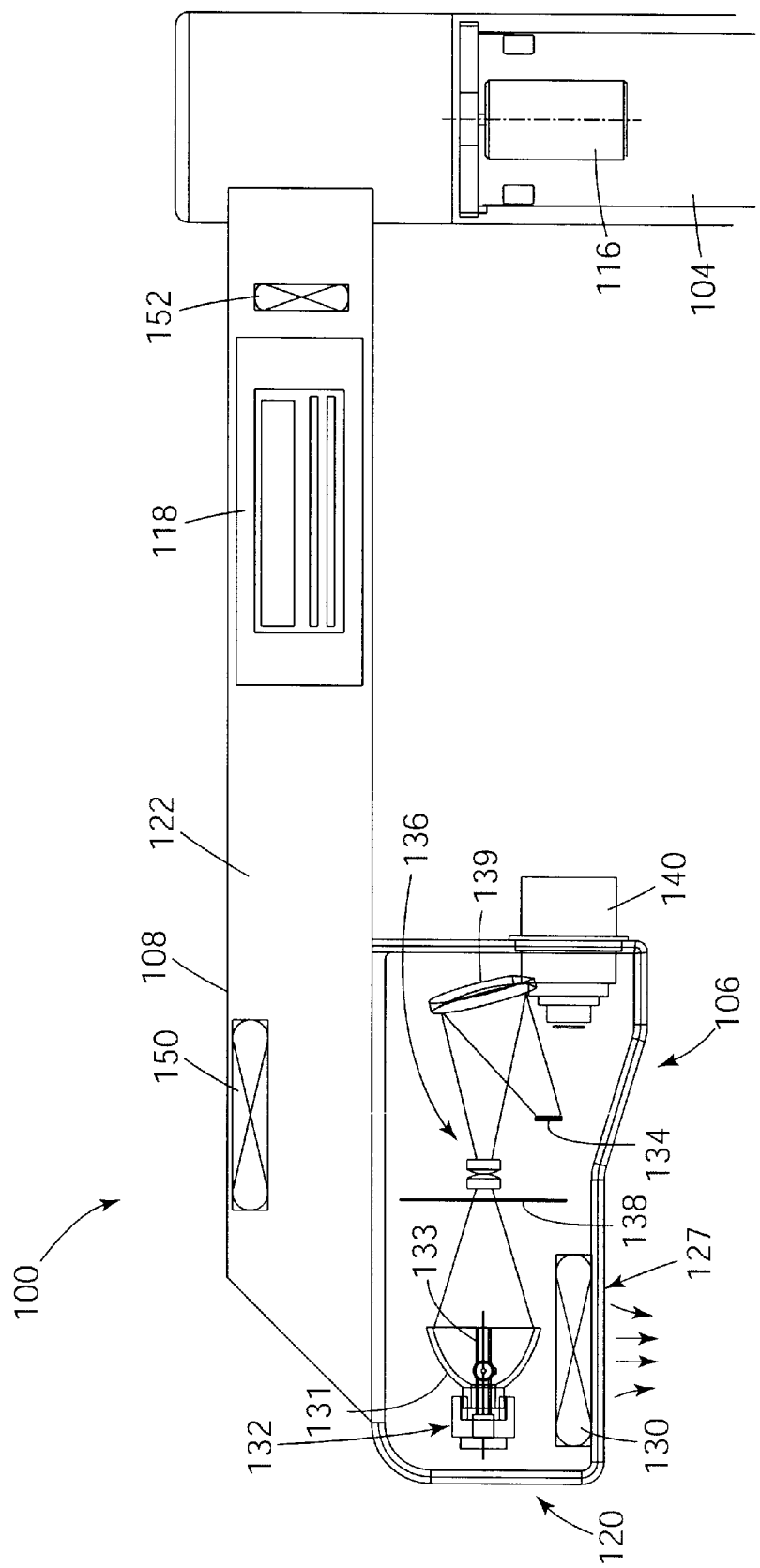
FIG. 6 is a schematic cut-away side elevation view of an exemplary embodiment of the arm and projection head of the integrated front projection system in accordance with the present invention.

An electronic optical engine includes imaging and electronic components. As better illustrated in FIG. 6, in projection system 100, arm 108 is a rigid hollow structure.

The structure of arm 108 defines an arm chamber 122 and allows for the modular and separate placement of a lamp controller module 118 and an imaging module 120. The lamp controller module 118 includes control boards, ballast, and other electronic components. The electronic elements are internally connected through an array of internal power and data connections. Imaging module 120 includes a light source, projection optics, color wheel and imager. By distributing components of the projection system along the arm and the frame, a lesser load is placed on second end 108b and the arm. Also, a smaller projector head size becomes possible. Those skilled in the art will recognize that a variety of different modular arrangements may be possible within alternative embodiments of the present invention. For example, alternatively, components of the electronics module may be placed inside of frame 104.

A considerable amount EMI/RFI (electromagnetic interference/radio frequency interference) shielding is required in traditional projector designs to reduce EM cross talk between the lamp and the electronic components and to have radio frequency containment. The separate placement of the electronic components within arm 108 reduces EMI/RFI interference. Furthermore, in an exemplary system 100, the power supply and control electronics module 118 is enclosed.

The present arrangement also offers an efficient thermal management system. Several fans 150 and 152 are located in arm 108 draw air through the interior of the hollow projection arm 108, cooling imaging module 120 and lamp controller module 118 located therein. The air exits the projection head 106 through an air outlet 129. Air also may be drawn through the projection head 106 through fan 130. The flow of cooling air also may be used to cool other components located in the projector head 106 or a separate cooling air flow or heat management elements may be used.

Commercially available electronic front projectors are designed to project a specified screen diagonal (D) at a specified throw distance (TD). The throw ratio (TR) of a projector is defined as the ratio of throw distance to screen diagonal. Magnification is measured as screen diagonal/imager diagonal. Optically, the unobtrusive arrangement of projection head 106 of projection system 100 requires that the image simultaneously accommodate three very demanding requirements of short-throw distance, high magnification, and large keystone correction. To minimize image shadowing, in the present exemplary embodiment, the projector head 106 is located at a projection angle about 15° and the arm measures about 30 inches (76.2 cm). In one exemplary embodiment screen 102 has a screen diagonal between 42 to 60 inches (about 107–152 cm).

Referring again to FIG. 6, the projection head 106 includes a lamp unit 132, an imager or light valve 134, condensing optics 136, a color wheel 138, a condensing mirror 139 and a projection lens 140. The projection head may also include polarization converters (for polarization rotating imager), infrared and ultraviolet absorption or reflection filters, an alternative light source possibly coupled with a lamp changing mechanism, reflector mirrors, and other optical components (not shown). The lamp unit 132 includes a reflector 131 and a lamp 133. The reflector 131 focuses the light produced by the lamp 133 through the color wheel 138. The beam of light then is condensed by the condensing optics 136 and the condensing mirror 139. The now condensed beam of light is reflected off the condensing mirror and is directed towards the reflective imager 134, which in turn reflects the light onto the projection lenses 140. The preceding description of projection head 106 merely describes one of front projection optics that can be used with the present invention. One skilled in the art will appreciate that any other type of front projection optics can be used, so long as such optics can meet the requirements specified above, i.e. short throw distance, high magnification, and large keystone correction.

The lamp unit 132 includes an elliptic reflector 131 and a high intensity arc, discharge lamp 133, such as the Philips UHP type, from Philips, Eindhoven, The Netherlands, or the OSRAM VIP-270 from Osram, Berlin, Germany. Other suitable bulbs and lamp arrangements may be used, such as metal halide or tungsten halogen lamps. Imager 134 comprises a single XGA digital micromirror device (DMD) having about an 18 mm (0.7 inch) diagonal, such as those manufactured by Texas Instruments, Inc., Dallas, Tex. The color wheel 138 is a spinning red/green/blue (RGB) color sequential disc producing 16.7 million colors in the projected image. In alternative embodiments, the color wheel and the imager 134 may be replaced by different suitable configurations, such as a liquid crystal RGB color sequential shutter and a reflective or transmissive liquid crystal display (LCD) imager. Those skilled in the art will readily recognize that other optical components and arrangements may be possible in accordance with the spirit of the present invention.

The imager 134 and the lamp 132 may be cooled by the airflow generated by the fan 130. A further thermal advantage of the arrangement of the present embodiment is that the warmer components, such as the lamp, are located at an end portion of the cooling air flow path, thus preventing the intense heat from the lamp from affecting delicate electronic components.

The focus of the lens 140 is preset for optimal resolution on screen 102. To provide full keystone correction, the light valve center may be shifted from the projection lens center by an amount equal to the projection angle. The keystone correction features need not be limited only to the optics. Keystone corrected optics, electronic keystone correction means, and screen inclination may be combined to achieve a suitable image. In an alternative embodiment, the screen may be motor driven, to reach an inclined projection position at the time that the arm is placed in the open position.

Those skilled in the art will appreciate that the present invention may be used with a variety of different optical components. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention.

Other variations and modifications may be made in accordance with the spirit and scope of the present invention.

What is claimed is:

1. An integrated front projection display system comprising:
   (a) a frame comprising a first portion and a second portion;
   (b) a foldable arm comprising a first end and a second end, said second end of said arm connected to said first portion of said frame, wherein said arm is moveable between a storage position and a projection position;
   (c) a retractable projection screen disposed on said second portion of said frame;
   (d) a projection head mounted on said first end of said moveable arm such that said projection head does not substantially obstruct the view of said projection screen when said moveable arm is in the projection position; and
   (e) a keystone correction mechanism for projecting a rectilinear image onto said projection screen.

2. The integrated front projection display system of claim 1, wherein said frame further comprising a third portion, containing at least one of a control panel and a utility tray.

3. The integrated front projection display system of claim 2, wherein said retractable projection screen is selected from the group consisting of foldable screen and scrollable screen.

4. The integrated front projection display system of claim 3, wherein said foldable screen comprises a left, a center, and a right panel, at least one of said left and said right panel capable of being folded onto said center panel when said display system is in said storage position.

5. The integrated front projection screen in claim 3, wherein said keystone correction mechanism is selected from the group consisting of optical mechanisms and electronic mechanisms.

6. The integrated front projection screen of claim 5, wherein said projection head includes a plurality of openings on its topside.

7. The integrated front projection screen of claim 1, where in said frame and said retractable projection screen are an integral component.

8. The integrated front projection screen of claim 1, wherein said retractable screen is dry erasable.

* * * * *